United States Patent [19]

Sinclair

[11] Patent Number: 4,458,431
[45] Date of Patent: Jul. 10, 1984

[54] BOOT FOR PET ANIMAL

[76] Inventor: Suzanne E. Sinclair, 186 Ninth Ave., New York, N.Y. 10011

[21] Appl. No.: 365,575

[22] Filed: Apr. 5, 1982

[51] Int. Cl.³ .................. A43B 11/00; A43B 7/20; A61D 9/00
[52] U.S. Cl. .................................. 36/88; 36/111; 36/50; D30/34
[58] Field of Search .............. 36/111, 88, 97, 102, 36/106, 7.2, 7.4, 11, 11.5, 50; D30/35, 34; 2/DIG. 6

[56] References Cited

U.S. PATENT DOCUMENTS

| D. 229,197 | 11/1973 | Jackson | 36/111 |
|---|---|---|---|
| 1,264,123 | 4/1918 | Pepper | 36/50 |
| 1,556,167 | 10/1925 | Smiley | 36/50 |
| 2,446,371 | 8/1948 | Jones | 36/111 |
| 2,926,434 | 3/1960 | Morgan | 36/11 |
| 3,106,790 | 10/1963 | Zimmon | 36/50 |
| 3,618,235 | 11/1971 | Cary, Jr. | 36/97 |
| 4,136,468 | 1/1979 | Munschy | 36/97 |
| 4,178,703 | 12/1979 | Pols | 36/105 |
| 4,190,183 | 2/1980 | Yates | 2/DIG. 6 |
| 4,361,970 | 12/1982 | Wren, Jr. et al. | 36/106 |

Primary Examiner—Werner H. Schroeder
Assistant Examiner—Steven N. Meyers
Attorney, Agent, or Firm—Nathaniel Altman

[57] ABSTRACT

A protective boot for pet animals has a sole member and a flexible upper attached together around their corresponding front and side edges, with the back of the boot left open for direct easy paw insertion. The upper is designed to be folded over on itself, or pleated, longitudinally to bring it into close-fitting conformity with the pet's paw, and adjustable fastening means are provided to hold the pleated upper in place. A securing strap encircles the boot around the instep and back of the heel; a second securing strap near the rear of the boot closes its open end around the lower portion of the pet animal's leg.

6 Claims, 9 Drawing Figures

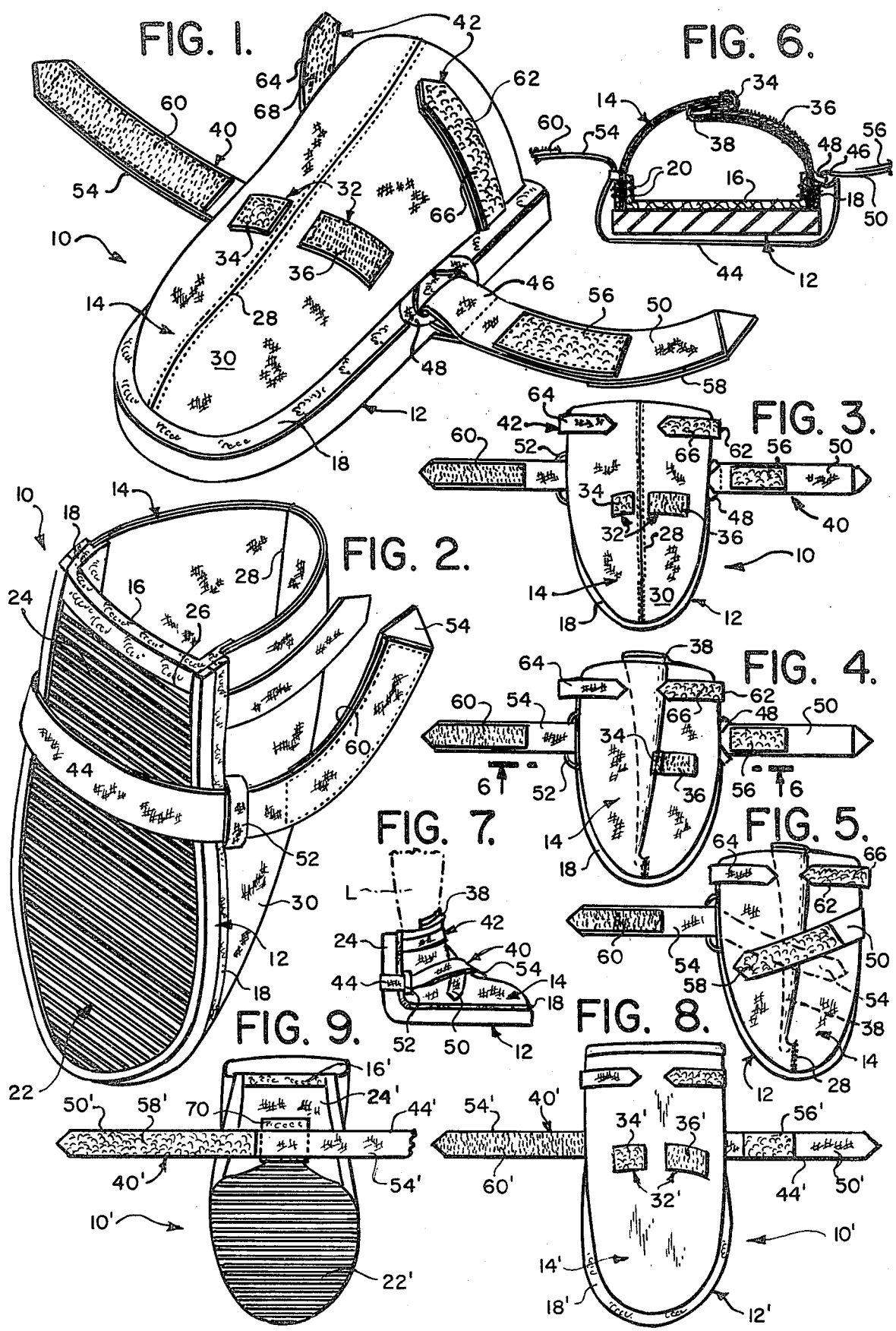

BOOT FOR PET ANIMAL

BACKGROUND OF THE INVENTION

Pet animals, most particularly dogs and cats, when permitted to walk outdoors during the winter months, are exposed to the corrosive action of salt and other chemicals used for clearing ice and snow. Intense discomfort or even infection of the paws or lower legs may result unless suitable protection is provided. While prior art has addressed this problem, no boot, legging or the like has been proposed which is easy to put on, sufficiently adjustable to ensure a snug fit and adequately securable to afford confident carefree comfort and unaltered gait.

Prior art patents considered include:
U.S. Pat. No. 2,446,371, 8/1948 McN. Jones; U.S. Pat. No. 2,443,831, 6/1948 Miller; U.S. Pat. No. 2,535,394, 12/1950 Davis; U.S Design Pat. No. 167,092, 6/1952 Monroe; U.S. Design Pat. No. 223,369, 4/1972 Jackson; U.S. Design Pat. No. 229,197, /1973 Jackson; U.S. Design Pat. No. 239,547, 11/1976 Henry;

None of these patents discloses an adjustable paw-covering upper for good fit, without the uncomfortable constriction of stretch material (Jones); no width-or height-adjustment of the boot portion of any of these references is indicated. In contrast, the present invention provides a water-resistant boot of superior quality, wide open for easy paw insertion and adjustable in size for comfortable secure fit.

SUMMARY OF THE INVENTION

The protective boot for pet animals of this invention comprises a flexible upper attached along its peripheral front and side edges to a sole pad, together forming an approximately conical space open at the rear of the boot for easy straight paw insertion. Adjustable fastening means (hook and loop type strips) are arcuately mounted on the outer surface of the boot's upper, in the region of the animal's instep, positioned to hold the folded or pleated upper in close-fitting relationship with the paw. A first securing strap means, suitably provided with hook and loop type strips, extends around the boot and, when closed, cooperates with the adjustable fastening means of the upper to form a retaining loop around the pet's instep and back of the heel. A second securing strap means, also with hook and loop type strips, binds the portion of the boot adjacent its open end in a substantially vertical position around the animal's lower leg, eliminating the possibility of a paw becoming inadvertently unshod.

The best mode of practicing this invention now contemplated, along with various modifications, will be described in greater detail in connection with the accompanying illustrative drawings, wherein:

BRIEF DESCRIPTION OF THE DRAWINGS

FIG. 1 is a perspective view, from the top and front, of a preferred form of protective boot for pet animals constructed in accordance with this invention:

FIG. 2 is a perspective view, from the rear and bottom, of the boot of FIG. 1;

FIG. 3,4, and 5 are top plan views of the boot of FIG. 1 shown in open, pleated and partially secured positions, respectively;

FIG. 6 is a sectional view, taken along line 6—6 of FIG. 4;

FIG. 7 is a left elevational view of the boot of FIGS. 1-6 in its fully secured position on the paw of a pet animal;

FIG. 8 is a top plan view of a modified embodiment of the protective boot; and

FIG. 9 is a bottom plan view of the boot of FIG. 8.

DESCRIPTION OF PREFERRED EMBODIMENTS

The pet animal boot 10 of FIGS. 1-7 generally comprises sole member 12 and upper member 14, attached together at front and sides through paw-contacting non-slip sole cushion 16 mounted on sole 12, binding strip 18, and multiple stitching 20 as best seen in FIG. 6. Sole member 12, is a substantially flat pad, conveniently formed of rubber or resilient plastic, ribbed or textured on its bottom 22 (FIG. 2) for good traction. Sole 12 is sufficiently flexible so that when boot 10 is fastened on a pet's leg, as shown in FIG. 7, rear portion 24 of sole 12 is held vertically, in turn holding sole cushion 16 against the back of the pet's heel and lower leg. As best seen in FIG. 2, the rearmost end, 26 of sole 12 is undercut so that only non-irritating sole cushion 16 contacts the animal's carpal pad.

In the preferred form of FIGS. 1-7, boot upper 14 is formed, from a double thickness of tightly woven water-repellent material such as that used for umbrellas, in two pieces, stitched together along centrally disposed longitudinal seam 28. This construction permits the provision of more material in the toe and vamp portion 30 of upper 14 to accomodate comfortably larger and/or higher animal paws. As best seen in FIG. 2 boot 10 is completely open at its rear and its straight unbent configuration makes insertion of the paw a simple and non-traumatic procedure.

Adjustable securing means 32 for holding upper 14 in comfortably-fitting relationship with the inserted animal's paw is attached approximately midway between toe portion 30 and the rear opening of boot 10. Specifically, securing means 32 comprises relatively short strips of hood and loop type such as those sold under the trademark of Velcro; loop strips 34 and hook strip 36 are arcuately positioned on the outer surface of upper 14 on either side of seam 28. To use securing means 32, boot 10 in the open position of FIGS. 1-3 is placed on the pet's paw and upper 14 is folded over selectively for snug fit to the position of FIGS. 4 and 6, where fold or pleat 38 has been formed, and the surface of loop strip 34 has been pressed into locking operative engagement with hook strip 36, thus securing upper 14 in its fitting, folded position.

To hold boot 10 in place on the animal's leg, first strap securing means 40 and second strap securing means 42 are provided. Securing means 40 comprises a single strap 44 encircling sole 12 and attached to boot 10 by stitched self-loop 46 interlocked with loop 48, with strap end 50 extending therefrom. Guide loop 52 supports the opposite end 54 of strap 44. Strap end 50 carries loop strip 56, positioned to engage in locking relationship with the exposed portion of hook strip 36, when end 50 is brought across upper 14, as in FIG. 5; the final secured position of strap securing means 40 is achieved by bringing strap end 54 into overlapping relationship with end 50 on which loop strip 58 is operatively engaged by hook strip 60 on strap end 54; this final position of strap end 54 is shown in dot-dash lines in FIG. 5. As seen in FIG. 7 first strap securing means 40 encircles the paw from the back of the heel around the instep, the interlocking of strips 36 and 56 maintains a firm unslippable position on the paw.

Second strap securing means 42 comprises half straps 62 and 64 attached to opposite sides of boot 10 adjacent to its rear open end. Loop strip 66 on strap 62 and hook strip 68 on strap 64 combine in locking engagement when properly overlapped to reach the final totally secured position of FIG. 7, with rear end 24 of sole 12 held substantially vertical by strap securing means 42 encircling the pet's lower leg.

The modified embodiment of FIGS. 8 and 9 is a boot 10', the upper 14' of which may be made, for example, from a single piece of plastic, artificial leather, or any suitable flexible and resistant material. As seen in FIG. 9, sole 12' is made of ribbed plastic or rubber in front portion 22', while rear portion 24' is fabric. First strap securing means 40' is removably attached to boot 10' by loop strip 70 on the bottom of sole 12', in engagement with hook strip 60' on strap member 44'. In all other respects, boot 10' corresponds and is equivalent to boot 10.

A protective boot for pet dogs and cats constructed in accordance with this invention has been described; modification of various elements and details are contemplated and fall within the scope of the invention as defined and limited only by the ensuing claims.

What is claimed is:

1. Boot for the protection of each paw of a pet animal from ice, snow, rain and corrosive ice-melting chemicals, which comprises:

substantially planar resilient sole means for protecting the bottom and heel of a pet animal's paw against slipping, and against being bruised, scraped and cut, said sole means being of sufficient rigidity to remain substantially flat when not in use and unstressed, at the same time having sufficient flexibility to be bent transversely and to be held in a selective angular position against a pet animal's heel and rear lower leg when the boot is in use;

a boot upper element formed of water-repellent material and secured water-resistantly along its peripheral front and side edges to the corresponding front and side edges of said sole means, thereby forming a boot which assumes and maintains unsupportedly a substantially conical shape when not in use, with the rear of the boot remaining automatically open for unhampered straight-line insertion of a pet's paw, said boot upper element being sufficiently flexible to be folded over on itself adjustably along a central longitudinal axis into a close-fitting relationship with the contour of an inserted paw, providing height and width adjustment of said boot upper element for fittingly accommodating a range of paw sizes and shapes;

adjustable fastening means affixed to the outer surface of said boot upper element for adjustably and releasably holding said boot upper element in its selectively folded-over position; and strap securing means for adjustably, firmly and releasably holding the protective boot in place on a pet animal's paw, with the rear portion of said sole means being held substantially vertically by said strap securing means against the rear of a pet animal's heel and lower leg.

2. A boot for pets in accordance with claim 1, wherein said sole means comprises a resilient sole pad and a sole cushion attached to and covering the top surface and rear edge of said sole pad.

3. A boot for pets in accordance with claim 1, wherein said upper element is formed by attaching two pieces of closely woven water-repellent fabric along a longitudinal centrally disposed seam.

4. A boot for pets in accordance with claim 1, wherein said adjustable upper fastening means comprises a complementary pair of hook and loop type fastener strips arranged arcuately across said upper and positioned to engage each other operatively in the region of the pet animal's instep when said upper is put into its folded-over position.

5. A boot for pets in accordance with claim 1, wherein said strap securing means comprises a securing strap, having mounted thereon hook and loop type fastener strips for adjustably holding said securing strap in operative engagement with said upper fastening means and in encircling relationship around the instep and back of the heel of the pet animal's paw.

6. A boot for pets in accordance with claim 1, wherein said strap securing means further comprises a second securing strap, attached to the boot adjacent to the open end thereof, said securing strap having mounted thereon complementary hook and loop type fastener strips for adjustably closing the open end of the boot around the pet's lower leg.

* * * * *